US006970624B2

(12) United States Patent
DiGiovanni et al.

(10) Patent No.: US 6,970,624 B2
(45) Date of Patent: Nov. 29, 2005

(54) CLADDING PUMPED OPTICAL FIBER GAIN DEVICES

(75) Inventors: David J. DiGiovanni, Montclair, NJ (US); Andrew D. Yablon, Livingston, NJ (US)

(73) Assignee: Furukawa Electric North America, Norcross, GA (US)

( * ) Notice: Subject to any disclaimer, the term of this patent is extended or adjusted under 35 U.S.C. 154(b) by 0 days.

(21) Appl. No.: 10/461,133

(22) Filed: Jun. 13, 2003

(65) Prior Publication Data

US 2004/0252946 A1    Dec. 16, 2004

(51) Int. Cl.[7] .................................................. G02B 6/26
(52) U.S. Cl. ............................. 385/43; 385/27; 385/31; 385/33
(58) Field of Search ........................ 385/27–29, 31–34, 385/39, 43

(56) References Cited

U.S. PATENT DOCUMENTS 5,864,644 A * 1/1999 DiGiovanni et al. .......... 385/43
6,043,929 A * 3/2000 Delavaux .................... 359/337
6,181,465 B1 * 1/2001 Grubb et al. ................ 359/337
6,411,757 B1 * 6/2002 Brener et al. ................. 385/43
6,433,927 B1 * 8/2002 Nyman et al. .............. 359/343
6,434,302 B1 * 8/2002 Fidric et al. ................... 385/43
6,597,711 B2 * 7/2003 Fernald et al. ................ 372/20
6,606,446 B1 * 8/2003 Shen et al. .................. 385/140
2003/0202762 A1 * 10/2003 Ukrainczyk et al. ........ 385/124

OTHER PUBLICATIONS

Kishimoto et al, Coupling Characteristics Between Single-Mode Fiber and Square Law Medium, Jun. 1982, IEEE Transactions on Microwave Theory and Techniques, VOl. MTT-30, NO.6, pp. 882-893.*

* cited by examiner

Primary Examiner—Juliana Kang

(57) ABSTRACT

The specification describes optical fiber gain devices, such as lasers and amplifiers, wherein losses due to a large step transition between an input section and a gain section are reduced by inserting an adiabatic transformer between the input section and the gain section. In the preferred case the adiabatic transformer comprises a GRadient INdex (GRIN) lens. The lens serves as an adiabatic beam expander (reducer) to controllably increase (reduce) the modefield of the beam as it travels through the step transition.

17 Claims, 3 Drawing Sheets

CLADDING PUMPED OPTICAL FIBER GAIN DEVICES

FIELD OF THE INVENTION

This invention relates to optical fiber gain devices with improved high gain performance. More specifically it relates to cladding pumped lasers and amplifiers.

BACKGROUND OF THE INVENTION

Optical fiber lasers and amplifiers using rare earth doped gain sections are widely used in lightwave communications systems. A preferred approach to implementing these devices is to introduce the pump energy into the cladding. The pump energy may propagate in the same direction or in the opposite direction as the signal. In an especially effective embodiment, multiple pump fibers are bundled around the fiber carrying the signal mode or the fundamental laser mode and connected to the cladding of the signal fiber. Reference herein to "main fiber" is intended to mean the fiber carrying the signal in the case of an optical fiber amplifier, and/or the lasing mode in a laser fiber. Multimode pump light is introduced into the multiple pump fibers and coupled to the cladding of the main fiber. Alternatively, pump and signal fibers can be contained within a common cladding along their length, allowing "side-pumping". Other multiplexing methods may be employed, but in each, the "main fiber" carries the signal or the lasing mode. A gain section is provided to allow the pump energy coupled into the cladding of the main fiber to amplify or provide energy to the propagating mode in the core of the main fiber. Cladding pumped optical fiber structures useful for lasers and amplifiers are described in more detail in U.S. Pat. Nos. 5,418,880, 5,937,134, and 5,966,491, all incorporated herein by reference.

A useful technique for bundling and attaching multiple pump fibers to a main fiber is described and claimed in U.S. Pat. No. 5,864,644, also incorporated by reference herein. That technique involves arranging the pump fibers around the main fiber and fusing them together. In a preferred case, the fused bundle is drawn so the diameter of the fused bundle is approximately equal to the diameter of the main fiber. However, an unintended result of this approach is that the core of the main fiber is reduced substantially. Accordingly, the pump combiner section, as just described, is typically coupled to a gain section having a larger core diameter. A large core diameter in the gain section is useful for enhancing the area ratio of core to cladding, and maximizing optical energy transfer for a given length of gain section.

Conveniently, there are other benefits to a large core diameter in the gain section. In very high power devices, the gain region, sometimes referred to as the active region, has a high optical energy density. If the energy density is too high, damage to the structure results, or non-linear impairments are incurred. The gain section in state of the art gain devices is made with a very large core so that high overall energy levels can be used while staying within the bounds of allowed energy density. However, the combination of a large core in the gain section, and a reduced core in the pump combiner section, results in an abrupt step as the signal being amplified (or the fundamental laser mode) transits from the pump combiner section to the gain section. Transmitting the beam across the step may result in significant losses.

BRIEF STATEMENT OF THE INVENTION

Losses due to an abrupt transition between the input, for example a pump combiner section, and the gain section of an optical fiber gain device are reduced according to the invention by inserting an adiabatic transformer between the input and the gain section. In the preferred case the adiabatic transformer comprises a GRadient INdex (GRIN) fiber lens. The lens serves as an adiabatic beam expander to controllably increase the modefield of the beam as it transits into the gain section. The pump energy may propagate in the same direction or in the opposite direction as the signal, and the invention is applicable to either case. When the mode transformer operates in the reverse direction, as in the counter-pumped case, it operates as an adiabatic beam concentrator.

BRIEF DESCRIPTION OF THE DRAWING

The invention may be better understood when considered in conjunction with the drawing in which.

DETAILED DESCRIPTION OF THE INVENTION

Figure 1:
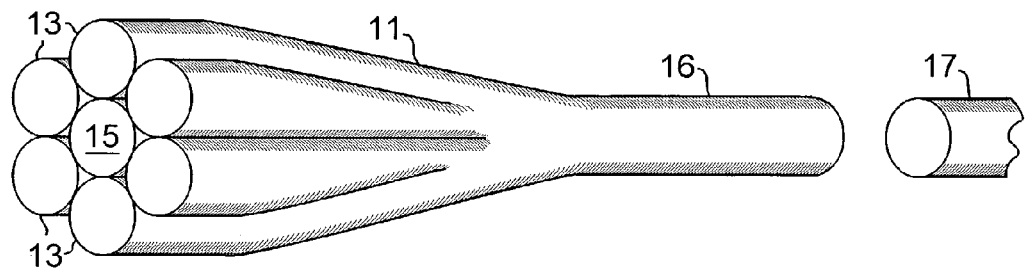
FIG. 1 is a schematic illustration of a multifiber pump combiner section.

With reference to FIG. 1, a conventional pump combiner section is shown at 11. Pump combiners of this kind are described in detail in U.S. Pat. No. 5,864,644, which is incorporated herein by reference for that description. A plurality of multimode optical pump fibers 13, shown here as six, are bundled in a circular configuration as shown. The optical fiber carrying the signal to be amplified, or the optical fiber with the active laser cavity in the case of a laser device, is shown at 15. In parts of this description, the active waveguide, whether for a laser or an amplifier, will be referred to as the signal fiber. The bundle is fused together, and drawn to produce the combined section shown at 16. In this illustration, the reduction produced by drawing is approximately one-third, and the core of the signal fiber is reduced by approximately one third.

The pump combiner section is spliced to a gain section, shown at 17.

Figure 2:
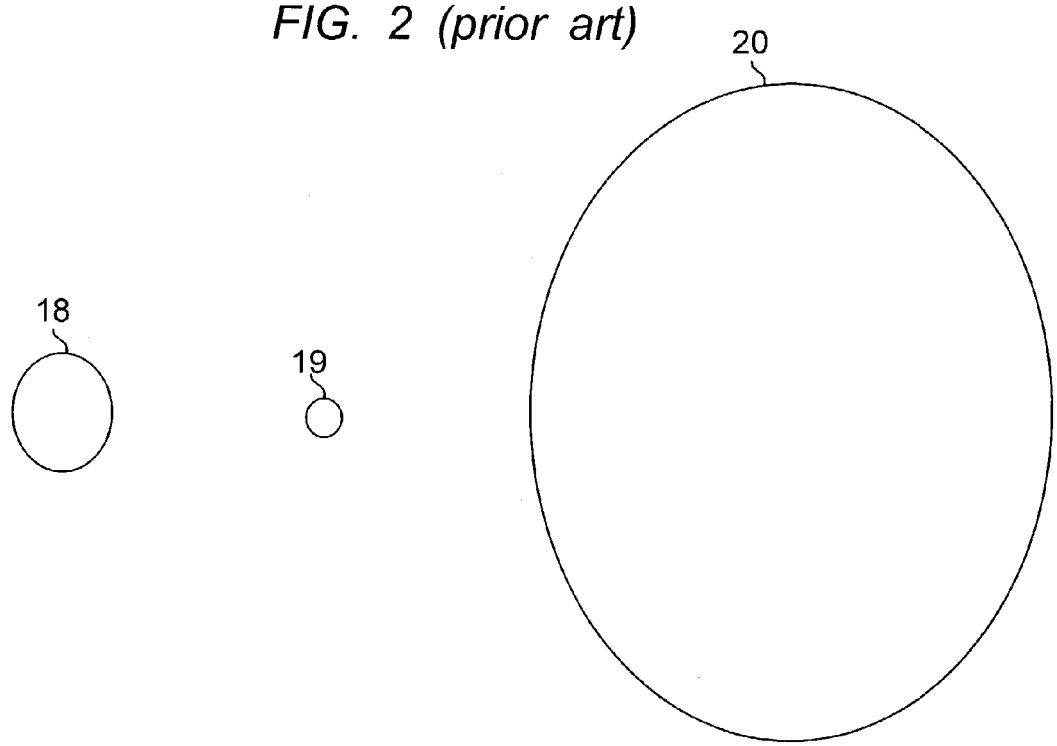
FIG. 2 is a diagram showing the relative core diameters of a typical signal input fiber, the output of a typical pump combiner section, and the input of a typical gain section, showing the disparity in core diameter and modefields.

FIG. 2 illustrates the severe discontinuity in the optical path as light travels from the input of optical fiber 15, through the reduced section 16 produced by the pump combiner 11, and then into the gain section 17. In FIG. 2, only the cores 18, 19, and 20 of the respective elements are shown. Following the example given previously, the core diameter 18 at the input 15 is a standard single mode core diameter, e.g. approximately 9 microns. This core is reduced in the pump combiner (core 19) to approximately 3 microns. The core 20 of the gain section, made large to prevent damage from excessive power density, is shown as approximately 50 microns. It is evident that a light beam that exits the core 19 of the pump combiner section 16, and is launched into core 20 of the gain section, experiences a severe step expansion. It is also evident, that such a large step allows a significant portion of the optical energy in the beam to couple into higher-order modes, and ultimately degrade desired amplification.

To reduce the severity of the discontinuity between the pump combiner section and the gain section, an adiabatic transformer is inserted between these elements. An adiabatic transformer is an element that transforms the modefield diameter without significant power loss. A preferred element for this function is a GRIN lens. Suitable GRIN lens elements are described in U.S. Pat. No. 4,701,011, wherein a GRIN lens element is used as a simple low loss coupler between optical fibers. That patent is incorporated by reference herein for a description of GRIN lens elements. A feature of a GRIN lens is it has a refractive index that is parabolically and monotonically graded radially from the center of the lens. In a typical embodiment, the GRIN lens has a cylindrical shape, and the index is parabolically graded from the center axis of the cylinder to the outside surface of the lens.

Figure 3:
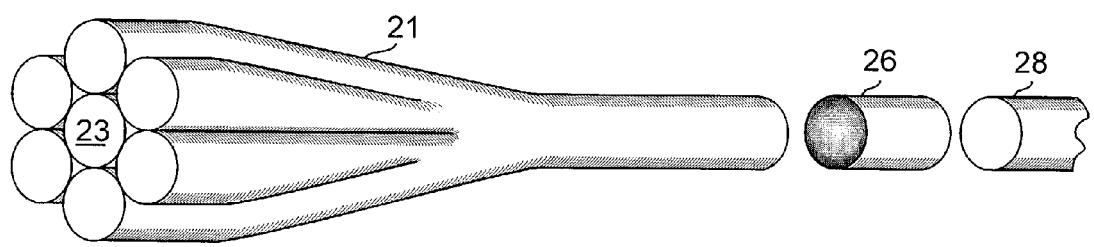
FIG. 3 is a view of a pump combiner section, coupled to a gain section through a GRIN lens element according to the invention.

FIG. 3 shows the arrangement just described. The pump combiner section is shown at 21, the signal fiber at 23, a GRIN lens at 26, and an input portion of the gain section at 28. The three elements are shown decoupled for clarity. When assembled into a finished device, these elements are fused together, or otherwise spliced, using standard optical fiber fusion splicing technology. In the preferred case, element 26 is a section of optical fiber with the same cladding outside dimensions as elements 21 and 28.

Figure 4:
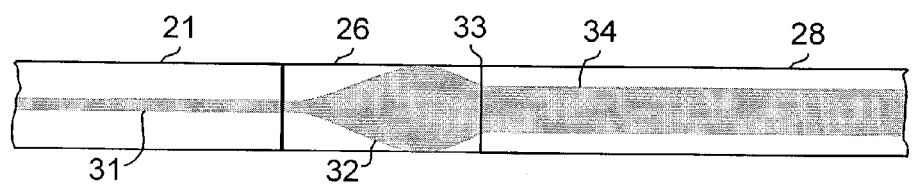
FIG. 4 is a schematic representation of the modefield patterns in the three elements shown in FIG. 3.

FIG. 4 shows the mode pattern of a light beam traveling across the coupled sections 21, 26, and 28. The reduced area beam that exits from the pump combiner section is shown at 31. When coupled to the GRIN lens element 26, the modefield expands controllably as shown. The length of the GRIN lens is chosen so that the output end of the lens, i.e. the interface 33, occurs where the beam spot size and the phase curvature of the beam essentially match corresponding characteristics of the gain section 28. This allows the beam to enter the gain section with a suitably expanded and collimated modefield 34, and without substantial insertion loss.

The GRIN lens may comprise an optical fiber section that is made with a monotonic parabolic index gradient. It may also comprise a plastic or other transparent body with this property. A GRIN optical fiber that is well adapted for use with the invention comprises a so-called square law medium. The radial dependence of the refractive index in a square law medium is:

$$n(r)=n_o[1-g^2r^2]^{0.5}$$

where $n_o$ is the refractive index on the optical axis, and g is a focusing parameter given by:

$$g=(2\Delta)^{0.5}/a$$

where $\Delta$ (=[n0−n(a)]/n(a)) is the index difference between the center core ($n_o$) and the cladding (expressed as a fractional quantity), and a is the core radius. Additional details of the properties of the Gaussian beam in element 26 is given by Kishimoto et al., IEEE Trans. Microwave Theory Tech., Vol. MTT-30, No. 6, pp. 882–893, June 1982, which is incorporated herein by reference.

The length over which a square law medium fully expands or fully contracts a beam with an initially planar phase front is referred to as the quarter-pitch length, and is equal to $\pi/2$ g, where g is the focusing parameter defined above.

Figure 5:
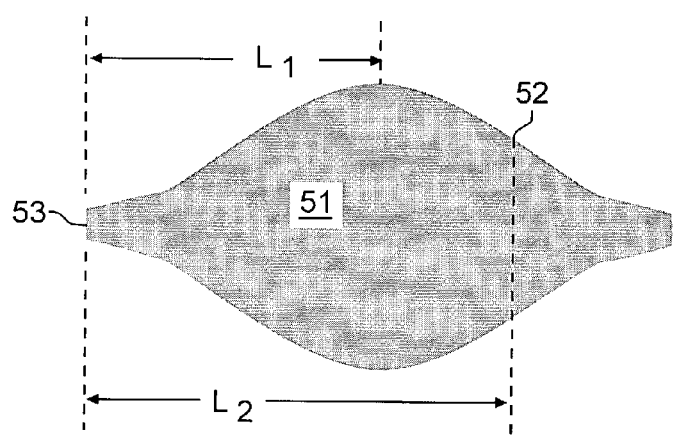
FIG. 5 is a schematic illustration of the modefield in a typical quarter-pitch length square law medium.

The adiabatic transformer of the invention is shown schematically in FIG. 5, where the pattern of the modefield is represented by 51. In a typical quarter-pitch length GRIN lens, the length $L_1$ is the quarter-pitch length. The length $L_2$ is selected at a position, e.g. 52, in the traveling lightwave front that corresponds to the modefield desired for coupling into the gain section 28. In a preferred case, the length of element 26 is equal or nearly equal to the quarter-pitch length. However, cases may arise where that dimension is smaller or larger than preferred, in which case length $L_2$ is made shorter or longer (as shown in the example) than $L_1$.

It should be understood that while a true quarter-pitch device is aptly suited for use in the invention, other lenses, which depart from square law behavior, may also be used.

In the example described in connection with FIGS. 2–5, the diameter of the core in the gain section of the device is shown as approximately 17 times the diameter of the core at the output of the pump combiner section. The larger this ratio, the greater the need for the adiabatic transformer of the invention. The invention is directed primarily at gain devices wherein the ratio representing the mismatch between the core diameter of the gain section and the core diameter at the output of the pump combiner is at least two, and more typically, greater than 10. In some cases it may be beneficial to bend the gain section to strip unwanted modes.

The pump combiner section shown in the figures and described above may be considered an end pump design, and is but one of several useful pump arrangements. For example, the optical pump and the gain section, rather than being two distinct, serially arranged elements, may be combined. In this case the pump is distributed along the gain section, and resembles a side-pumped device. A device of this general design is described in U.S. Pat. No. 4,553,238.

Figure 6:
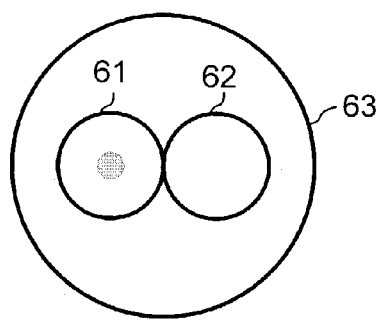
FIGS. 6 and 7 are a schematic views of an alternative type of pump combiner.
Figure 7:
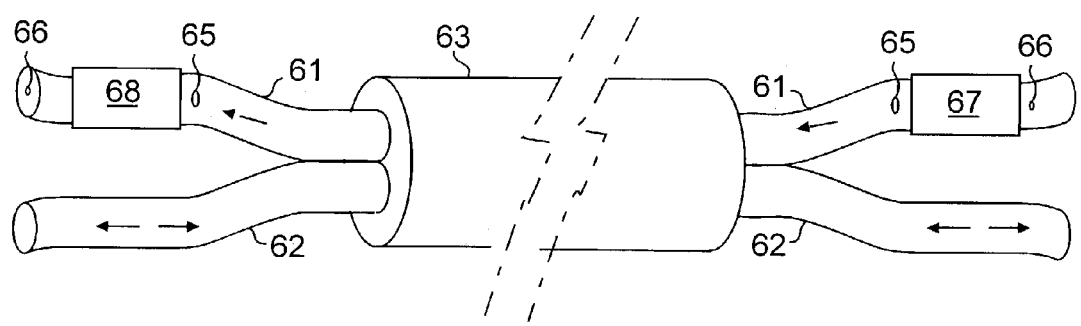

An example of a device with a distributed pump section is shown in FIGS. 6 and 7. Schematically, an end view of an optical fiber gain section is shown at 61. The pump source is a multimode optical fiber 62 that is arranged side-by-side with the gain fiber. When these fibers are close enough, energy from the pump fiber transfers to the gain fiber. The phenomenon is well known and has been used for some time in optical couplers. In FIG. 6, the two side-by-side fibers 61 and 62 are shown with common coating 63. A variety of forms of this pump arrangement are possible. More than one pump fiber may be used in an arrangement similar to that shown at the input end of the pump combiner of FIG. 3. The pump and gain fibers may be drawn down to a smaller diameter, and fused together, if desired. However, it is sufficient if they are assembled in close proximity. FIG. 7 shows the distributed pump embodiment of FIG. 6 with the input and output ends shown. The gain section, of which FIG. 6 is a representative cross section, is indicated at 63. The amount of gain in the device will be approximately proportional to length of the gain section, i.e., the length along which the fibers are coupled. The gain fiber is shown at 61, and carries the optical signal, or lasing mode. The pump fiber is shown at 62. The modefield diameter is represented by circles 65, 66. The adiabatic transformers of the invention are shown at 67 and 68. In this device, two transformers are shown. Transformer 67, at the input side, expands the modefield to match the modefield in the gain section. The second transformer, 68, is used in reverse to return the modefield pattern to the original shape, or to reduce the modefield pattern if different sized modefield areas (input vs. output) are desired. As indicated by the arrows, the pump light may propagate in either direction.

Reference herein to a gain section or a gain device is intended to describe optical fiber means that enhance the power of a traveling lightwave in a fiber. The fibers are doped with a rare earth element, typically erbium, or combinations of rare earth elements Er, Nd, Yb, Sm, La, Ce, Pr, Pm, Gd, Tb, Dy, Ho, Tm, Lu. Other dopants, for example, Al, P, are also frequently present.

Various additional modifications of this invention will occur to those skilled in the art. All deviations from the specific teachings of this specification that basically rely on the principles and their equivalents through which the art has been advanced are properly considered within the scope of the invention as described and claimed.

What is claimed is:

1. An optical gain device comprising:
   a. an input optical fiber,
   b. an optical fiber adiabatic transformer section comprising a GRIN optical fiber attached to the input optical fiber,
   c. an optical fiber gain section attached to the optical fiber adiabatic transformer section, and
   d. means for optically pumping the gain section,
   wherein the GRIN optical fiber has a refractive index that is graded so that a light beam passing through the GRIN optical fiber has a modefield that expands from the input optical fiber to the optical fiber gain section.

2. The device of claim 1 wherein the means for optically pumping the gain section is an end pump.

3. The device of claim 2 wherein the means for optically pumping the gain section is a pump combiner section with an input and an output, and the input comprises a main fiber associated with one or more pump fibers to form an assembly.

4. The device of claim 3 wherein the pump combiner section has a tapered portion that reduces the assembly to the approximate dimensions of the main fiber, thereby producing a single fiber output.

5. The device of claim 3 wherein the main fiber has a modefield diameter $D_1$ at the input and a modefield diameter $D_2$ at the output, and $D_2$ is substantially less than $D_1$.

6. The device of claim 1 wherein the means for optically pumping the gain section is a side pump.

7. The device of claim 6 wherein the means for optically pumping the gain section is a distributed pump section comprising a gain fiber associated with one or more pump fibers.

8. The device of claim 1 wherein the gain section has a modefield diameter $D_3$, with $D_3$ greater than $2 \times D_2$.

9. The device of claim 1 wherein the GRIN optical fiber section comprises a quarter-pitch square law medium with a quarter-pitch length $L_1$.

10. The device of claim 9 wherein the length of the GRIN optical fiber section is $L_2$, and $L_2$ is less than $L_1$.

11. The device of claim 9 wherein the length of the GRIN optical fiber section is $L_2$, and $L_2$ is greater than $L_1$.

12. A laser gain device comprising the device of claim 1.

13. An optical fiber amplifier comprising the device of claim 1.

14. An optical fiber amplifier comprising the device of claim 13 and further including means for introducing an optical signal into the input optical fiber.

15. The optical gain device of claim 1 in which the gain section is bent to attenuate unwanted higher order modes.

16. The device of claim 1 wherein the GRIN optical fiber is spliced to the optical fiber gain section.

17. The device of claim 16 wherein the GRIN optical fiber is fusion spliced to the optical fiber gain section.

* * * * *